Oct. 2, 1956     A. N. ANDREWS     2,764,986
SPRINGLESS CLASPING IMPLEMENT
Filed Dec. 8, 1952     3 Sheets-Sheet 1
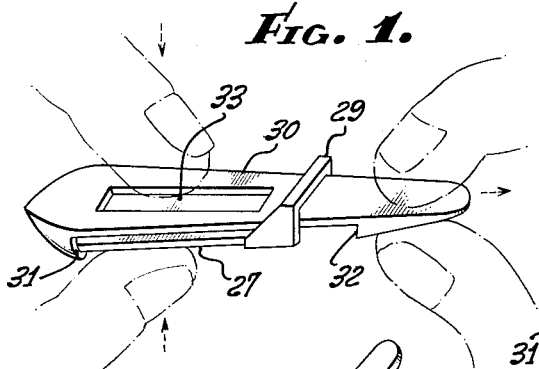
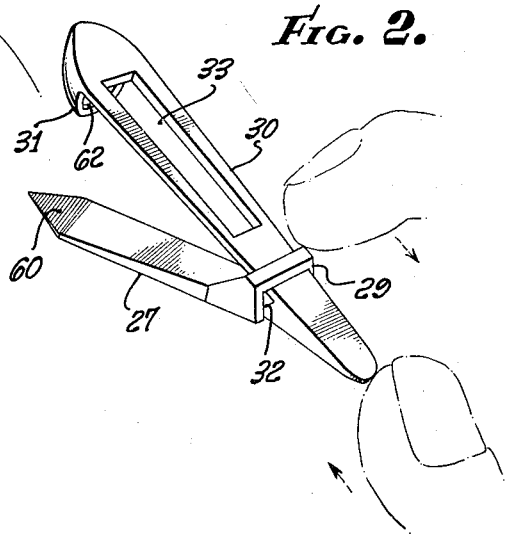
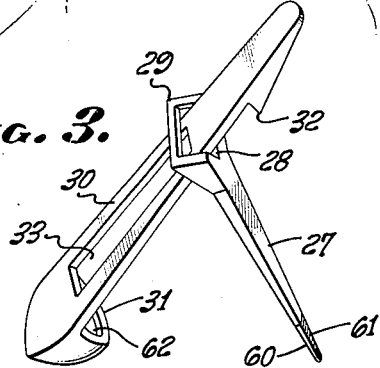
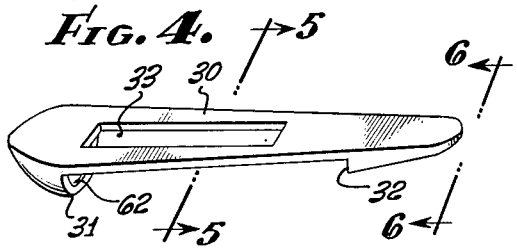
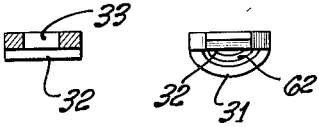
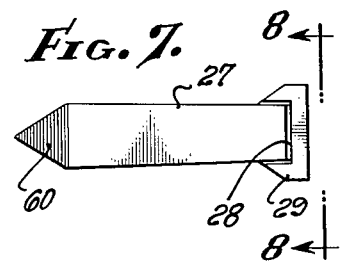
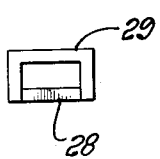
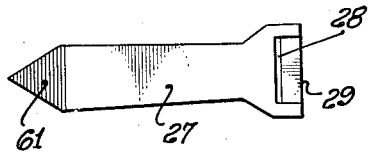
Anatol N. Andrews
INVENTOR.

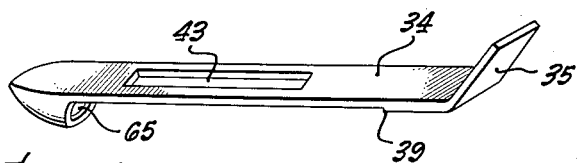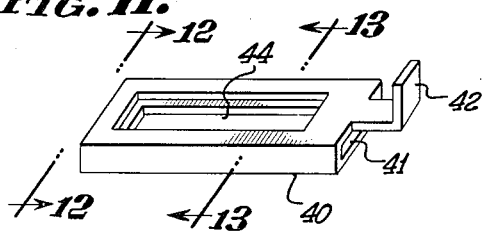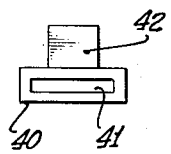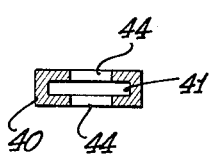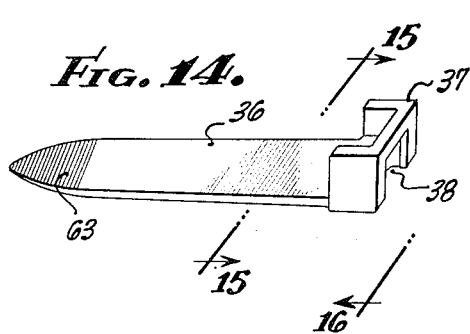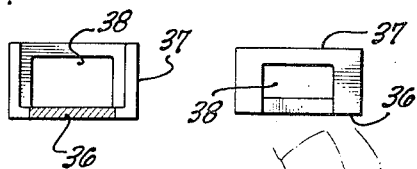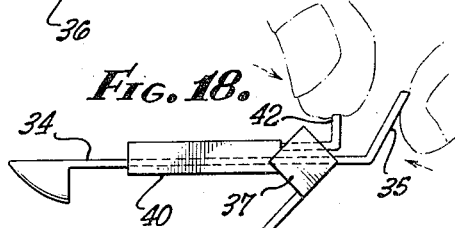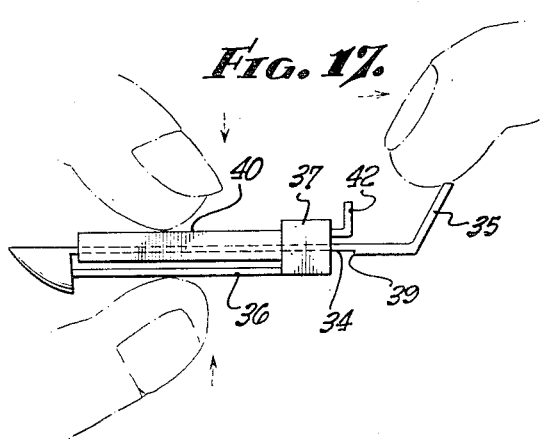

Oct. 2, 1956 A. N. ANDREWS 2,764,986
SPRINGLESS CLASPING IMPLEMENT
Filed Dec. 8, 1952 3 Sheets-Sheet 3
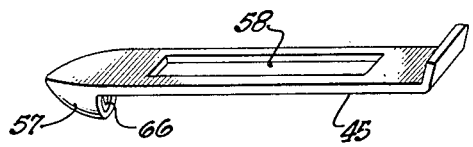
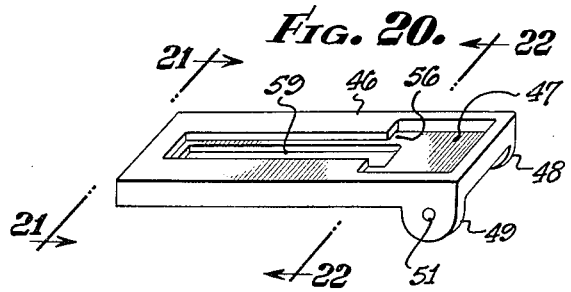
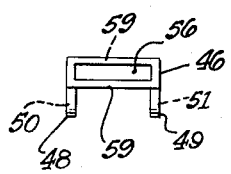
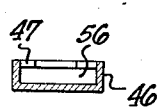
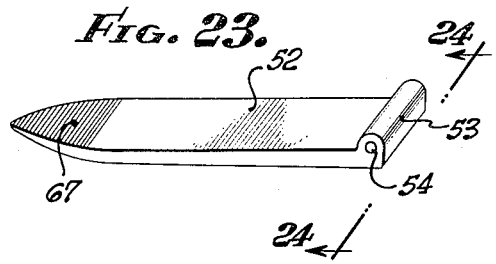
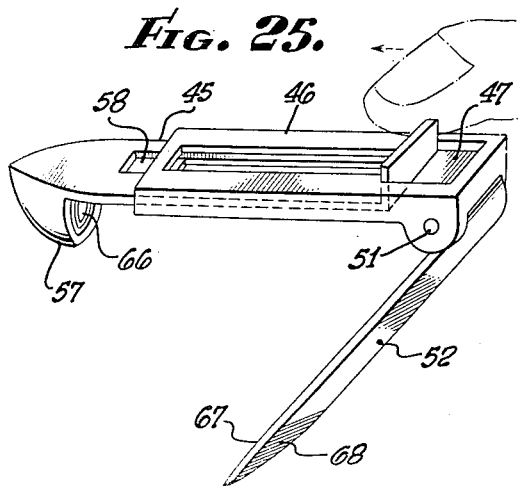
Anatol N. Andrews
INVENTOR.

United States Patent Office

2,764,986
Patented Oct. 2, 1956

2,764,986
SPRINGLESS CLASPING IMPLEMENT

Anatol N. Andrews, Los Angeles, Calif.

Application December 8, 1952, Serial No. 324,758

7 Claims. (Cl. 132—46)

This invention relates to clamps, and is a springless clasping implement for clasping a springy object, for instance, a finger wave curl.

Ordinary clamps heretofore available for holding a finger wave curl clasp the latter unevenly, they exercise more pressure at one side than at the opposite side which produces unnaturally looking curl. Furthermore, most of said clamps use strong springs which are hard to release whereby hair is often pulled in the process of removing said clamps from the curls.

One of the objects of the present invention is to provide a springless clamp having features of construction that will enable its two elongated flat members to be held together at both ends in substantially parallel position in relation to each other for an even and balanced grip over a finger wave hair curl clasped therebetween.

Another object of this invention is to provide cooperating cam elements for closing the clasping implements and means to retain them closed comprising tapering sides and pointed end of one of aforesaid elonagted flat members slidingly engaging a cavity in an offset extending from the respective end of the other elongated flat member, whereby the clamp may be adjusted to various thicknesses in finger wave curls.

Still another object of this invention is to provide a construction in such a clamp embodying a trigger-like offset portion extending above the clasped curl for manual engagement to activate the sliding of one of the elongated flat members in relation to another to release the clamp without disturbing the curl.

Further objects of the invention will appear hereinafter.

The invention consists in the novel parts and combination of parts to be described hereinafter, all of which contribute to produce an efficient springless clamp.

Preferred embodiments of the invention are described in the following specification, while the broad scope of the invention is pointed out in the appended claims.

In the drawings:

Figures 1 to 9 inclusive illustrate one embodiment of this invention.

Figure 1 is perspective view of a clasping implement embodying principles of this invention, and shows the implement in closed position.

Figure 2 is a similar view of the same implement in open position, and indicates manual method for operating the implement.

Figure 3 is a similar view of the same implement and shows it open with members in different positions in relation to each other than shown in Figure 2.

Figure 4 is a perspective view of a member hereinafter referred to as the first member in this embodiment and forming a part of the implement shown in the preceding figures.

Figure 5 is a cross-sectional view taken at 5—5 of Figure 4.

Figure 6 is a cross-sectional view taken at 6—6 of Figure 4.

Figure 7 is a top plane view of a member hereinafter referred to as the second member in this embodiment and forming a part of the implement shown in Figures 1, 2 and 3.

Figure 8 is a view taken at 8—8 of Figure 7.

Figure 9 is the bottom plane view of said second member.

Figures 10 to 18 inclusive illustrate another embodiment of this invention.

Figure 10 is a perspective view of one member hereinafter referred to as the first member in this second embodiment.

Figure 11 is a perspective view of another member hereinafter referred to as the third member of the second embodiment.

Figure 12 is a view taken at 12—12 of Figure 11.

Figure 13 is a view taken at 13—13 of Figure 11.

Figure 14 is a perspective view of still another member hereinafter referred to as the second member of the second embodiment.

Figure 15 is a cross-sectional view taken at 15—15 of Figure 14.

Figure 16 is a view taken at 16—16 of Figure 14.

Figure 17 is a side view of aforemembers of this embodiment assembled into a clasping implement and shows the latter in closed position.

Figure 18 is the similar view as in Figure 17 and shows the implement in open position.

Figures 19 to 26 inclusive illustrate still another embodiment of this invention.

Figure 19 is a perspective view of a member hereinafter referred to as the first member in this embodiment.

Figure 20 is a perspective view of another member hereinafter referred to as the third member in this embodiment.

Figure 21 is a view taken at 21—21 of Figure 20.

Figure 22 is a cross-sectional view taken at 22—22 of Figure 20.

Figure 23 is a perspective view of still another member hereinafter referred to as the second member in this embodiment.

Figure 24 is a view taken at 24—24 of Figure 23.

Figure 25 is a perspective view of the afore members of this embodiment assembled into a clasping implement and shows the latter in open position.

Figure 26 is a side view of the same implement as in Figure 25 and shows the implement in closed position.

In reference to the drawings:

In Figures 1 to 9 inclusive the first member is shown separately in Figures 4, 5 and 6, and comprises an elongate, substantially flat portion 30 having parallel upper and lower plane faces, and sides tapering from a wide end to a narrow end, the wide end having an offset portion 31 extending downwardly from said lower face and having a cavity 62 whose opening faces the narrow end, the narrow end having a lesser offset portion extending downward from said lower face and an abutment 32 facing said cavity 62. If the implement is to be used on a springy object requiring application of liquids thereagainst during such employment, for instance, a finger wave curl requiring permanent wave solution, the elongated portion 30 of the first member may be provided with openings for such liquids to pass through, or a single opening of suitable size and shape, for instance, a rectangular slot 33. The second member is shown separately in Figures 7, 8 and 9 and comprises an elongated portion 27 with plane upper and lower surfaces, separated by sides, said surfaces and sides tapering from a broad end to a pointed end 60 and 61, a trigger-like offset portion 29 of said broad end extends upwardly (Figure 8) from the upper surface and has an opening 28 therein which opening is a continuation of the opening in the broad end of elongate 27 which opening extends a short distance along the elongate 27 towards said pointed end 60 and 61. Said two openings together constitute a gateway through which the narrow end of the first member is adapted to be inserted with the upper surface of said second member facing the lower surface of said first member. Said gateway and said trigger-like offset portion constitute the hinge permitting said two members to swing toward each other with a spring object, for instance, a finger wave hair curl, between them. Said first member is slidable with respect to said second member with the sides of the gateway constituting cooperating cam elements for closing the clasping implement, said pointed end 60 engaging said cavity 62 to retain said clasping implement closed.

To engage the implement, for instance, with a finger wave curl the pointed end 60—61 of the second member is inserted under and beyond the curl. The first member is slid forward as far as abutment 32 in the offset permits and then is swung towards the second member over the curl and pressed down until the pointed end 60—61 of the second member faces the entrance into cavity 62. Then the first member is slid backwards as indicated in Figure 1 against the springy resistance of the curl therebetween. While the first member is being so slid the pointed end 60—61 of the second member enters the cavity 62. The inside walls of said cavity may be tapered towards the lower face of the first member for cooperation with the adjustment of the grip of the implement against varying thicknesses and resistances in different curls. In order to release the clamp from the curl the index finger (Figure 2) may be placed over the trigger-like edge of the offset 29 of the second member while the thumb pushes the narrow end of the first member forward. This will cause the first member to slide forward thus releasing its cavity 62 from the pointed end 60 of the second member. The natural springy quality of the curl will force the elongate 30 of the first member to swing from the elongate 27 of the second member thus freeing the clamp which then may be easily removed from the curl by merely pulling the elongate 27 out which should not disturb the subject curl nor the adjacent curls, and which requires much less of physical effort than to remove an ordinary clamp with a strong spring.

In Figures 10 to 18 inclusive the first member is shown separately in Figure 10 and comprises an elongate, substantially flat portion 34 having parallel upper and lower plane faces separated by parallel sides. One end (which is to the right on the drawing on Figure 10) has a trigger-like offset portion 35 extending upwardly from said upper face, and a lesser offset portion extending downwardly from said lower face and an abutment 39 facing cavity 65 which cavity is in an offset extending downwardly from said lower face at the opposite end of said first member. The elongated portion 34 may have a rectangular slot 43 if it is desired to allow there an opening for liquids to pass therethrough. The second member is shown separately in Figures 14, 15 and 16 and comprises an elongated portion 36 with plane upper and lower surfaces, separated by sides, said surfaces and sides tapering from the broad end to a pointed end 63 (Figure 14). An offset portion 37 of said broad end extends upwardly from the upper surface and has an opening 38 therein which opening is a continuation of the opening in the broad end of elongate 36 which opening extends a short distance along the elongate 36 toward said pointed end 63. Said two openings together constitute a gateway through which the end 35 of the first member is adapted to be inserted with the upper surface of said second member turned towards the lower surface of said first member. The third member is shown separately in Figures 11, 12 and 13 and comprises an elongated portion 40 with upper and lower surfaces, separated by solid sides and a hollow elongated tunnel-like slot 41 open at both ends and forming a thorough tunnel through the entire elongate 40 of the third member, and adapted for the elongated portion 34 of the first member to be slidably inserted therethrough (Figures 17 and 18). One end (which is to the right in Figure 11) of said third member has a hook-like portion 42 secured with said upper surface and above said slot 41 and extending a short distance outwardly lengthwise with and from said upper surface of elongate 40 and thereafter forming an offset extending upwardly from said upper surface and adapted to be inserted through said gateway in the second member. Said gateway and said portion 42 constitute the hinge permitting said two members to swing towards each other with springy object like a finger wave curl between them and while a portion of elongate 34 of the first member is slidably inserted through said slot-tunnel 41 of the third member and while offset 35 and abutment 39 of the first member are inserted through and beyond said gateway of the second member. Thus said first member is slidable with respect to said second and third members with the sides of the gateway constituting cooperating cam elements for closing the clasping implement, said pointed end 63 of the second member engaging said cavity 65 of said first member to retain said clasping implement closed. The elongated portion 40 of the third member may be provided, if desired, with a rectangular slot 44 through the upper and lower surfaces and adapted to correspond with slot 43 in the first member when the latter is slidably inserted through tunnel 41 of the third member. Inasmuch as both of said slots 43 and 44 are adapted only to allow liquids, like permanent wave solution, to pass therethrough to the clamped curl, they may be substituted by openings of different configurations and, if the clamp is used on a springy object requiring no such liquids, said slot may be, of course, completely eliminated. To engage the implement shown in Figures 10 to 18 inclusive with, for instance, a finger wave curl, the pointed end 63 of the second member is inserted under and beyond the curl. The first member is slid forward through tunnel 41 of the third member as far as abutment 39 permits and then the third member is swung towards the second member over the curl and pressed down until the pointed end 63 of the second member faces the entrance into cavity 65 of the first member. Then the latter is slid backwards as indicated in Figure 17 by an index finger of one hand engaged against offset 35 of the first member while two fingers of the other hand hold elongates 40 and 36 of the third and second members firmly pressed towards each other against springy resistance of the curl therebetween. The third member is specifically provided to allow such firm grip over the implement and the curl since, because of said third member, such grip evidently does not handicap the slidability of the first member in respect to the second member in the process of securing the clamp over the curl. While the first member is being so slid the pointed end 63 of the second member enters the cavity 65. The inside walls of said cavity are tapered towards the lower face of the first member cooperating with the tapering of said pointed end 63 for adjustment of the grip over different thicknesses and/or resistances of different curls. In order to release the clamp from the curl the index finger (Figure 18) may be placed over thee trigger-like edge of offset 42 of the third member while the thumb pushes offset 35 of the first member forward. This will cause the first member to slide forward thus releasing the cavity 65 from the pointed end 63. The springy quality of the curl will then force elongate 40 of the third member to swing from elongate 36 of the second member thus freeing the clamp for the heretofore described easy removal from the curl.

In Figures 19 to 26 inclusive the first member is shown separately in Figure 19 and comprises an elongate, substantially flat portion 45 having parallel upper and lower plane faces separated by parallel sides. One end (which is to the right on the drawing of Figure 19) has a trigger-like offset portion (similar to offset 35 in Figure 10) extending upwardly from said upper face. The opposite end has an offset 57 extending downwardly from said lower face and having cavity 66 facing said right end. The elongate portion 45 may be provided with a rectangular slot 58 to allow liquids to pass therethrough. The second member is shown separately in Figures 23 and 24 and comprises an elongated portion 52 with plane upper and lower surfaces, separated by sides, said surfaces and sides tapering from a broad end to a pointed end. An offset portion 53 of said broad end extends upwardly from the upper surface and is rounded and has a small rounded pivot-like protuberance 55 extending sidewise a short distance from one side, and a similar protuberance 54 likewise extending from the other side. The third member is shown separately in Figures 20, 21 and 22 and comprises an elongated portion 46 with upper and lower surfaces separated by solid sides and a hollow elongated slot 56 open at both ends and forming a thorough tunnel through a substantial portion of elongate 46 and adapted for the elongated portion 45 of the first member to be slidingly engageable therethrough (as indicated in Figures 25 and 26). A portion of the upper surface of elongate 46 has a rectangular cutout 47 extending downwardly to the bottom of said slot 56 and adapted as a seat for said trigger-like offset of the first member and for said trigger-like offset to be lengthwise manually slidingly engaged therein within the limits of said cutout 47 as indicated in Figures 25 and 26. One end (which is to the right in Figure 20) of said third member has an offset 49 extending downwardly from said lower surface at one side and having a small hole 51 crosswise therethrough, and a similar offset 48 extending downwardly from the same surface at the opposite side and having a like hole 50 crosswise therethrough and opposite hole 51, and said holes 51 and 50 are adapted as pivot seats for said protuberances 54 and 55 respectively of the second member when offset 53 thereof is pressed in between said offsets 49 and 48 of the third member as indicated in Figure 25. When said second member is so connected with said third member, and when said first member has its elongate 45 and the trigger-like offset in slot 56 and cutout 47 of the third member respectively, the first member is slidable with respect to said second and third members with the pivot protuberances 54 and 55 pivot seats (holes 51 and 50) constituting cooperating cam elements for closing the clasping implement, and said pointed end 67 of the second member engaging said cavity 66 of the first member to retain said clasping implement closed. The elongated portion 46 of the third member may be provided with openings or an opening, for instance, rectangular slot 59 all way through the upper and lower surfaces to correspond with likewise opening, for instance, slot 58 in the elongate 45 of the first member when the latter is engaged in the tunnel-like slot 56 of the third member to let liquids pass through said slots (58 and 59) if it is desired to use the implement with a spring object requiring such liquids during the engagement. To engage the implement shown in Figures 19 to 26 inclusive with, for instance, a finger wave curl, the pointed end 67 of the second member is inserted under and beyond the curl. The first member is slid forward through tunnel 56 of the third member by means of manually pushing forward the trigger-like offset of the first member as far as the forward wall of cutout 47 would permit (as indicated in Figure 25). Then the third member is swung towards the second member over the curl and pressed down until the pointed end (67—68) of the second member faces the entrance into cavity 66 of the first member. Then the latter is slid backwards as indicated in Figure 26 by pulling with index finger the trigger-like offset of the first member backwards while two fingers of the other hand hold elongates 46 and 52 of the third and second members firmly pressed towards each other against spring resistance of the curl therebetween. As in the preceding embodiment the third member in this embodiment is likewise specifically provided to allow such firm grip over the implement and the curl since said pressure is absorbed by the outside frame of the third member and does not interfere with the slidability of the first member within the tunnel 56 of the third member in respect to the second member. While the first member is being so slid the pointed end 67—68 of the second member enters the cavity 66. The inside walls of said cavity may be tapered towards the lower face of the first member to cooperate in adjusting the grip of the implement over varying thicknesses and/or hair resistances found in various curls. To release the implement from the curl the index finger (Figure 25) may be applied against the upper edge of the trigger-like offset of the first member and said offset pushed forward which would cause the first member to slide likewise and release cavity 66 from the pointed end 67—68.

Many other embodiments of the invention may be resorted to without departure from the spirit of this invention.

I claim as my invention:

1. A springless clasping element for clasping a springy object comprising two slidingly hinged members, the first member comprising an elongate, substantially flat member having parallel upper and lower plane faces, and sides tapering from a wide end to a narrow end, the wide end having an offset portion extending downwardly from said lower face and having a cavity whose opening faces the narrow end, the narrow end having a trigger-like offset portion extending downward from said lower face and an abutment facing said wide end, said first member having a rectangular slot extending from said opening to a point spaced a considerable distance inward from said said abutment, the second member comprising an elongate member with plane upper and lower surfaces, separated by sides, said surfaces and sides of said second member tapering from a broad end to a pointed end, an offset portion at said broad end extending upwardly from the upper surface of the second member having an opening therein, said broad end having an opening constituting a continuation of the opening in the offset portion, and extending along the second member a short distance towards said pointed end, said two openings together constituting a gateway through which the narrow end of the first member is adapted to be inserted with the upper surface of the second member facing the lower surface of said first member, said gateway and said trigger-like offset portion constituting the hinge permitting said two members to swing toward each other with said spring object between them, said first member being slidable with respect to said second member with the tapered sides of the gateway constituting cooperating cam elements for closing the clasping implements, said pointed end engaging said cavity to retain said clasping implement closed.

2. A springless clasping implement for clasping a springy object comprising two slidingly hinged members, the first member comprising an elongate, substantially flat member having parallel upper and lower plane faces, and sides tapering from a wide end to a narrow end, the wide end having an offset portion extending downwardly from said lower face and having a cavity whose opening faces the narrow end, the narrow end having an offset portion extending downward from said lower face and an abutment facing said wide end, the second member comprising an elongate member with plane upper and lower surfaces, separated by sides, said surfaces and sides of said second member tapering from a broad end to a pointed end, a trigger-like offset portion at said broad end extending upwardly from the upper surface of the second member having an opening therein, said broad end having an opening constituting a continuation of the opening in the offset portion, and extending along the second member a short distance towards said pointed end, said two openings together constituting a gateway through which the narrow end of the first member is adapted to be inserted with the upper surface of said second member facing the lower surface of said first member, said gateway and said offset portion constituting the hinge permitting said two members to swing towards each other with said spring object between them, said first member being slidable with respect to said second member with the sides of the gateway constituting cooperating cam elements for closing the clasping implements, said pointed end engaging said cavity to retain said clasping implement closed.

3. As in claim 2 and said first member having an opening through the middle section of its flat portion from and through its upper plane face to and through its lower plane face and between said cavity and said abutment, said opening adapted for pouring liquid therethrough over a portion of said springy object when the latter is clasped between said first and second members.

4. A springless clasping implement for clasping a springy object comprising three slidingly hinged members, the first member comprising an elongate, substantially flat portion having parallel upper and lower plane faces separated by parallel sides, one end having a trigger-like offset portion extending upwardly from said upper face, and a lesser offset portion extending downwardly from said lower face, and an abutment facing the opposite end, and the latter end having an offset extending downwardly from said lower face and having a cavity whose opening faces said abutment, and the second member comprising an elongated portion with plane upper and lower surfaces, separated by sides, said surfaces and sides tapering from a broad end to a pointed end, an offset portion of said broad end extending upwardly from the upper surface of the second member having an opening therein, said broad end having an opening constituting a continuation of the opening in the offset portion, and extending along the second member a short distance towards said pointed end, said two openings together constituting a gateway through which a narrow end of a third member is adapted to be inserted with the upper surface of said second member facing a lower surface of said third member, and said third member having said narrow end and a broad end and comprising an elongated portion with upper and lower surfaces, separated by parallel sides and a tunnel-like slot therebetween through the entire length of said portion of said third member, and constituting a tunnel through which the flat portion of the first member is adapted to be slidably inserted with the opening of said cavity facing the broad end of said third member, and said tunnel remaining between said cavity and said abutment, and the narrow end of said third member extending above and lengthwise beyond said tunnel and has a hook-like offset portion extending upwardly from said upper surface, and said trigger-like offset portion of said first member extending in combination lengthwise beyond said hook-like portion of said third member, and said hook-like portion and said gateway constituting a hinge permitting the third and the first members to swing towards the second member with said spring object therebetween, said first member being slidable with respect to said third and second members, with the sides of said gateway constituting cooperating cam elements for closing the clasping implements, and said pointed end engaging said cavity to retain said clasping implement closed.

5. As in claim 4 and said first member having an opening through its flat portion from and through its upper face to and through its lower face and between said cavity and said abutment, and said third member having an opening through the middle section of its elongated portion from and through its upper surface to and through its lower surface crosswise through said tunnel-like slot, and a substantial portion of said opening in the first member corresponds with a substantial portion of said opening in the third member when the flat portion of the first member is slidingly engaged through said tunnel-like slot in the third member, and said openings are adapted for pouring liquid therethrough over a portion of said springy object when the latter is clasped between said third and said second members.

6. A springless clasping implement for clasping a springy object comprising three elongated members, the first member comprising an elongate, substantially flat member having parallel upper and lower plane faces and parallel sides, and one end having an offset portion extending downwardly from said lower face and having a cavity whose opening faces the opposite end, and the latter end having a trigger-like offset portion extending upwardly from said upper face, the second member comprising an elongate member with plane upper and lower surfaces, separated by sides, said surfaces and sides of said second member tapering from a broad end to a pointed end, an offset portion of said broad end extending upwardly from the upper surface of the second member having provisions on its sides for being hinged with one end of a third member, said third member comprising an elongate member with plane upper and lower surfaces, separated by sides, a portion of said upper surface closer to one end is rectangularly caved in, a tunnel-like slot parallel to said upper and lower surfaces extends between them through the elongate from the opposite end into said caved in portion and is adapted for the elongate portion of the first member to be inserted and slidingly engaged therein, and said caved in portion is adapted for said trigger-like offset portion of the first member to be slidingly engaged lengthwise therealong facing upwardly, and the end which is closer to said caved in portion has offsets extending downwardly from said lower surface at its sides facing each other, said offsets having provisions for being hinged with aforesaid sides of said offset portion of the second member constituting therewith the hinge permitting said second and third members to swing towards each other with said spring object between them, said first member being slidable with respect to said second and third members, and said sides constituting cooperating cam elements for closing the clasping implements, and said pointed end engaging said cavity to retain said clasping implement closed.

7. As in claim 6 and said first member having an opening through its flat portion from and through its upper face to and through its lower face and between said cavity and said trigger-like offset, and said third member having an opening through the middle section of its elongated portion from and through its upper surface to and through its lower surface crosswise through said tunnel-like slot, and a substantial portion of said opening in the first member corresponds with a substantial portion of said opening in the third member when the flat portion of the first member is slidingly engaged through said tunnel-like slot in the third member, and said openings are adapted for pouring liquid therethrough over a portion of said springy object when the latter is clasped between said third and said second members.

References Cited in the file of this patent

UNITED STATES PATENTS

| | | |
|---|---|---|
| 1,726,017 | Des Enfants | Aug. 27, 1929 |
| 1,893,794 | Bove | Jan. 10, 1933 |
| 2,466,976 | Walton | Apr. 12, 1949 |
| 2,655,927 | Ammen | Oct. 20, 1953 |